US007011235B2

(12) United States Patent
Pasquariello

(10) Patent No.: US 7,011,235 B2
(45) Date of Patent: Mar. 14, 2006

(54) VEGETATION CARE VESSEL

(76) Inventor: Antonio A. Pasquariello, 22127 Gresham Ave., West Hills, CA (US) 91304

( * ) Notice: Subject to any disclaimer, the term of this patent is extended or adjusted under 35 U.S.C. 154(b) by 1 day.

(21) Appl. No.: 10/843,980

(22) Filed: May 13, 2004

(65) Prior Publication Data

US 2005/0252935 A1 Nov. 17, 2005

(51) Int. Cl.
*B67D 5/56* (2006.01)
(52) U.S. Cl. .................. 222/133; 222/192; 222/321.7; 222/465.1
(58) Field of Classification Search ............. 222/129, 222/133, 192, 321.7, 465.1
See application file for complete search history.

(56) References Cited

U.S. PATENT DOCUMENTS

| 4,700,892 A | * | 10/1987 | Cunning | 239/289 |
| 4,925,066 A | * | 5/1990 | Rosenbaum | 222/129 |
| 4,932,563 A | * | 6/1990 | Diamond et al. | 222/129 |
| 5,915,628 A | * | 6/1999 | Kreizel | 239/377 |
| 6,799,700 B1 | * | 10/2004 | Durant et al. | 222/129 |

* cited by examiner

*Primary Examiner*—Joseph A. Kaufman
(74) *Attorney, Agent, or Firm*—Elliott N. Kramsky

(57) ABSTRACT

A vegetation care vessel for facilitating the care of plants and other vegetation. A hollow body includes a top portion, a planar bottom portion and a continuous wall portion. A spout communicates with the interior of the hollow body. An inwardly-projecting region is provided in the wall for receiving a dispenser having a compressor-spout. An aperture is arranged in the top portion of the body for admitting liquid from the compressor-spout into the interior of the hollow body.

5 Claims, 2 Drawing Sheets

VEGETATION CARE VESSEL

BACKGROUND

1. Field of the Invention

The present invention relates to devices for use in maintaining plants and the like. More particularly, this invention pertains to a vegetation care vessel for conveniently dispensing water and fertilizer.

2. Description of the Prior Art

The maintenance of indoor and outdoor plants and other vegetation is often, perhaps usually, the responsibility of someone, such as a homeowner or apartment dweller, other than a gardener or other skilled professional.

Such fertilizer is usually applied in liquid form and may be purchased either in the form of an emulsion of ingredients or in dry form for subsequent mixing with water. Common types of plant fertilizers include those containing buffered nutrients, fish emulsions and kelp. In a buffered nutrient fertilizer, a so-called NPK complex is often included that comprises nitrogen, phosphoric acid and soluble potash. Such a fertilizer is especially effective in enhancing a plant's ability to absorb the nutrients in solution. This is accomplished by lowering the pH of the soil from the basic 8.4 level of tap water (with a nutrient absorption efficiency of approximately 25 percent) to a level closer to the slightly acidic 6.3 to 6.5 pH range at which plants absorb nutrients with approximately 90 percent efficiency.

While there exists much science establishing the parameters of good plant care and documenting the need for regular application of nutrients in addition to water, non-professional caretakers rarely adhere to a regular and beneficial schedule of plant feeding. Whereas the need to water is universally recognized, the significance, and adverse consequences from neglect, of regular application of nutrients is less understood by non-professionals. In addition, non-professionals are less likely to maintain a regular routine of nutrient application even when in possession of the requisite knowledge.

Non-professionals often consider plant care a formality and are unwilling to put any more than a minimal amount of time into such "extras" as application of nutrients. Rather, while the nuances of watering, including variation of the watering schedule in accordance with climactic conditions and avoidance of over-watering are obvious and generally observed, the feeding of plants is often considered a hassle, unnecessary and to be avoided.

SUMMARY OF THE INVENTION

The preceding and other shortcomings of the prior art are addressed by the present invention that provides a vegetation care vessel. Such vessel includes a substantially-hollow body. The body has an integral planar bottom portion, a continuous wall portion and a top portion. A spout is fixed to the wall portion and a handle is fixed to the body.

An elongated dispenser of predefined shape has a compressor-spout arranged to displace liquid from the interior of the dispenser.

The wall portion includes an inwardly-projecting region arranged to receive the dispenser.

The foregoing and other features of the invention will become further apparent from the detailed description that follows. Such written description is accompanied by a set of drawing figures. Numerals of the written description, corresponding to those of the drawing figures, point to the features of the invention. Like numerals refer to like features throughout both the written description and the drawing figures.

BRIEF DESCRIPTION OF THE DRAWING FIGURES

DETAILED DESCRIPTION OF THE PREFERRED EMBODIMENT

Figure 1:
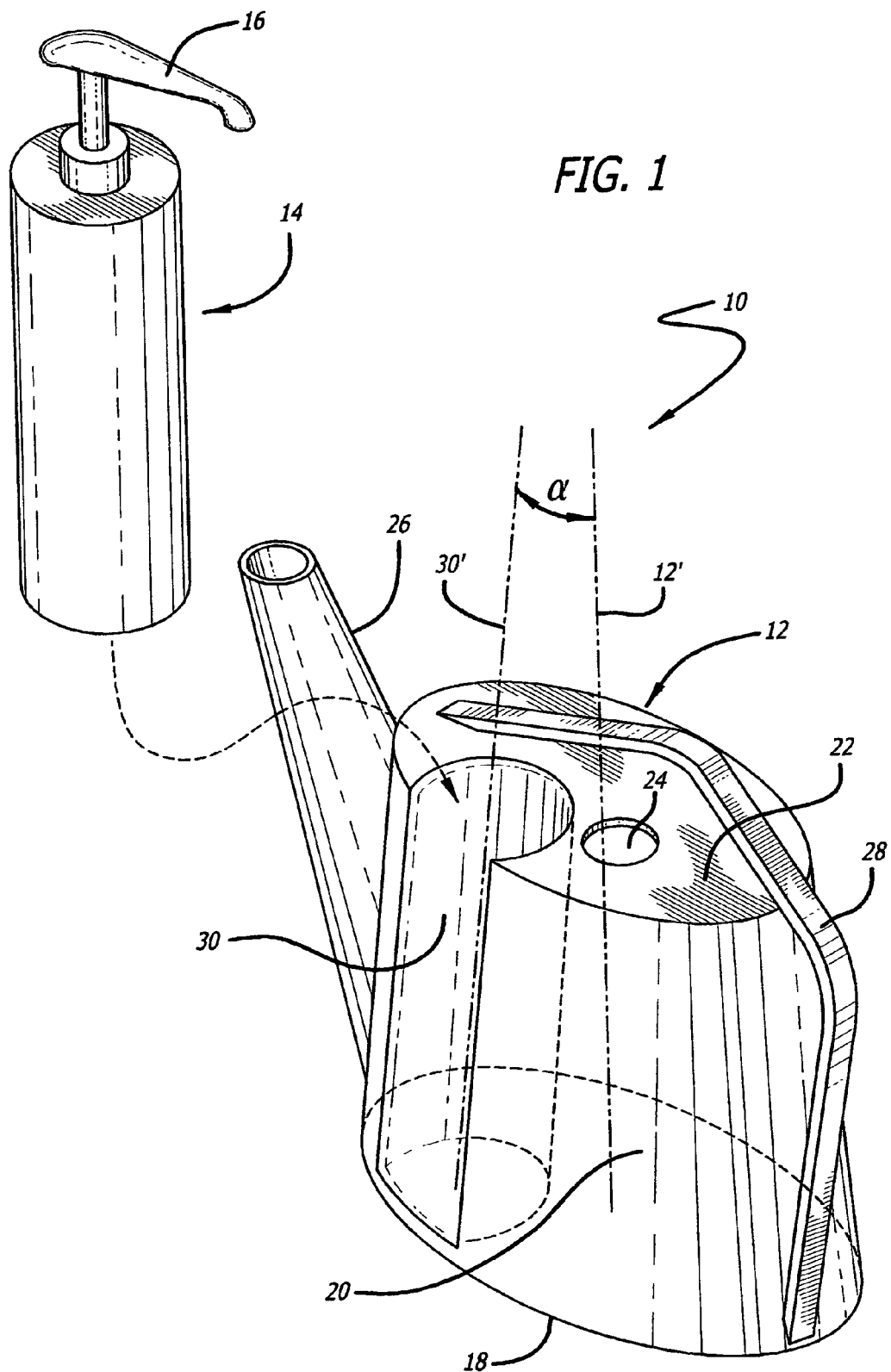
FIG. 1 is an exploded perspective view of the vegetation care vessel 10 of the invention.

FIG. 1 is an exploded perspective view of the vegetation care vessel 10 of the invention. The vessel 10 includes a substantially-hollow body 12 and a dispenser 14 of the type that includes an internal pump (not shown) that terminates at the top of the dispenser 14 in a compressor-spout 16 for charging the interior of the dispenser 14 to cause liquid plant food or fertilizer to be forced upwardly within the dispenser 14 and to it through a channel (not shown) internal to the compressor-spout 16. Such a compressor-spout 16 is of a type that is well known in the art.

The dispenser 14 is preferably of elongated cylindrical shape dimensioned to hold a specific maximum quantity (e.g. 16 fluid oz.) of liquid plant food.

The body 12 comprises an integral, substantially planar bottom portion 18 (shown in shadow outline), a continuous wall portion 20 and an upper portion 22 that includes an aperture 24. The body is preferably formed of molded plastic or like synthetic material forming and defining a hollow internal reservoir for receiving water and liquid fertilizer through the aperture 24.

A spout 26 communicates with the hollow interior of the body 12. It is preferably joined to the wall portion 20 near the bottom portion 18 to permit maximum drainage of fluid from the interior of the body 12 upon tipping. A handle 28 is fixed to the body 12 to allow a user to manipulate the vessel 10. Typically, the user will employ the handle 28 to tip the body 12 so that water and liquid fertilizer mixed therewith is poured from the reservoir internal to the body 12. Gravity force causes the fluid to flow from the reservoir, through the spout 26 and onto vegetation.

An internally-projecting region 30 is formed within the continuous wall portion 20 of the body 12. The region 30 is dimensioned and contoured to receive the cylindrical dispenser 14 in fixed relation to the body 12. This assures that a user may transport both water (within the internal reservoir of the body 12) and liquid plant food or fertilizer (within the dispenser 14) as a single unit.

The region 30 is inclined inwardly toward the center of the body 12 at an angle α. That is, the axis of rotation 30' of the region 30 forms an angle α with a line 12' that lies in the imaginary front-to-back plane that bisects the symmetrical body 12. In the event that the body 12 were of circular cross-section of necessarily identical front-to-back and side-to-side symmetries, the line 12' would comprise the central axis of the body 12. It will be seen below that, by providing a slight (e.g. 5 degrees) inward tilt to the region 30 for receiving the dispenser 14, the security of mutual fixation of the two major elements of the vessel 10 (the body 12 and the dispenser 14) is enhanced during use.

In contrast to the prior art, the inattention to regular plant feeding that generally characterizes non-professional plant care is addressed by providing a resultant vessel 10 that combines the (regularly performed) function of watering with the (often overlooked) function of nutrient supplementation. In addition, by including a dispenser 14 of the type that relies upon a compressor-spout 16 of the type described above, the precise addition of an amount of nutrient that is appropriate for the vegetation at hand is facilitated. Thus, the vessel 10 facilitates plant feeding and enhances the quality of plant care that can be expected from the non-professional.

Figure 2:
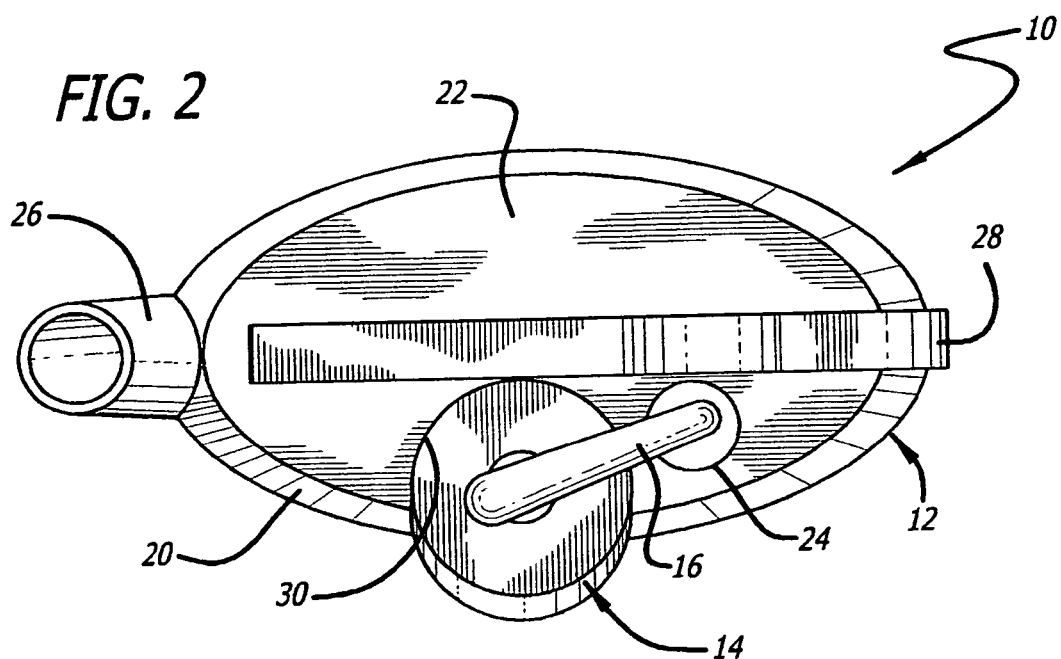
FIG. 2 is a top plan view of the invention.

FIG. 2 is a top plan view of the vegetation care vessel 10 of the invention. As can be seen, the cylindrical dispenser 14 is fixed to the body 12 at the inwardly-projecting region 30 of the continuouse wall portion 20. The location of the aperture 24 is coordinated with the length of the compressor-spout 16, the diameter of the dispenser 14 and the size of the region 30 so that, upon application of a downwardly-compressive force to the compressor-spout 16, a quantity of liquid fertilizer will be forced from the interior of the dispenser 14, across the length of the compressor-spout and downwardly into the interior of the body 12 through the aperture 24.

A predictable amount of liquid fertilizer is thus pumped from the interior of the dispenser into the internal reservoir of the body 12, where it is mixed with water prior to being poured from the body by manipulation of the handle 28, upon each downward stroke of the compressor-spout 16. As a rule of thumb, the non-professional caretaker might adopt a regimen of accompanying the watering of some varieties of vegetation with a predetermined number of strokes of the compressor-spout 16 (e.g. one "squirt" for house plants; two "squirts" for vegetables and outdoor plants).

Figure 3:
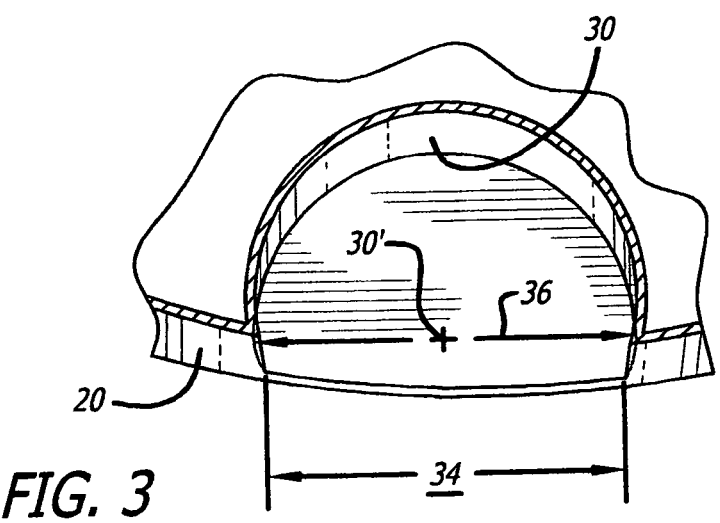
FIG. 3 is a planar view in fragmentary detail focused upon the inwardly-projecting region of the invention.

FIG. 3 is a planar view in fragmentary detail focused upon the inwardly-projecting region 30 of the body 12 of the invention. The region 30 is seen to be generally arcuate for accommodating the cylindrical dispenser 14. The arcuate shape of the region 30 is dimensioned, in relation to the outer periphery of the body 12, so that its axis of symmetry 30' (and, thus, the central axis of the cylindrical dispenser 14) falls within the outer periphery of the body 12. This assures the opening 34, provided within the periphery of the body 12, and shown as an elongated opening in periphery of the body 12 in FIG. 1, is smaller than the diameter 36 of the dispenser 14. (Note, the dispenser 14 is fixed to the body 12 by lowering it vertically into the inwardly-projecting portion 30 of the body 12.) Such an arrangement, resulting in a "lip" at the intersection of the region 30 with the periphery of the body 12, secures the position of the dispenser 14. Further, as mentioned earlier, the inward angular inclination α of the axis 30' of the region 30 with respect to the center of the body 12 results in the slightly-angular positioning of the dispenser 14 so that its center of gravity (due substantially to the weight of its liquid content) lies between the wall portion 20 and the center 12' of the body. Such a configuration further secures the dispenser 14 to the body 12 by creating an inwardly-directed torque force to further secure engagement of the dispenser 14 to the body 12.

Thus it is seen that the present invention provides a vegetation care vessel that addresses and overcomes the difficulty that the non-professional encounters in taking care of house plants and other vegetation. By providing a vessel that incorporates a dispenser suitable for charging with liquid plant food, one is automatically provided with the necessary nutrients for optimum plant care whenever watering his plants. By fixing the relationship of the dispenser to a body that includes an internal reservoir so that liquid fertilizer can be transferred to the reservoir in a simple and convenient manner, the highly-advantageous application of fertilizer on a regular basis becomes a simple adjunct to the watering process.

While the invention has been described with reference to its presently-preferred embodiment, it is not limited thereto. Rather, this invention is limited only insofar as it is defined by the following set of patent claims and includes within its scope all equivalents thereof.

What is claimed is:

1. A vegetation care vessel comprising, in combination:
   a) a substantially-hollow body;
   b) said body comprising an integral planar bottom portion, a continuous wall portion and a top portion;
   c) a spout fixed to said wall portion;
   d) a handle fixed to said body;
   e) an elongated dispenser of generally-cylindrical shape having a top and a bottom and including a compressor-spout arranged to displace liquid from the interior of said dispenser;
   f) said body including an elongated opening in said wall portion;
   g) an inwardly-projecting, partially-cylindrical region extending from said elongated opening for receiving said dispenser; and
   h) said partially-cylindrical region having an inwardly-directed tilt so that, when received in said partially-cylindrical region, the top of said dispenser is displaced with respect to the bottom of said dispenser toward the interior of said body.

2. A vessel as defined in claim 1 further including:
   a) said top portion of said body having an aperture; and
   b) said elongated dispenser and said aperture being arranged so that said compressor-spout is capable of displacing liquid from said dispenser into the interior of said hollow body.

3. A vessel as defined in claim 1 wherein the width of said opening is less than the diameter of said partially-cylindrical inwardly-projecting region.

4. A vessel as defined in claim 3 wherein said body is of integral molded composition.

5. A vessel as defined in claim 4 wherein said body is of elastomeric composition.

* * * * *